United States Patent
Hasegawa

(10) Patent No.: US 11,120,187 B1
(45) Date of Patent: Sep. 14, 2021

(54) SEMICONDUCTOR INTEGRATED CIRCUIT, CIRCUIT DESIGNING APPARATUS, AND CIRCUIT DESIGNING METHOD

(71) Applicants: Kabushiki Kaisha Toshiba, Tokyo (JP); Toshiba Electronic Devices & Storage Corporation, Tokyo (JP)

(72) Inventor: Tetsu Hasegawa, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/011,166

(22) Filed: Sep. 3, 2020

(30) Foreign Application Priority Data

Mar. 10, 2020 (JP) .............................. JP2020-040598

(51) Int. Cl.
*G06F 30/333* (2020.01)
*G06F 30/3308* (2020.01)
(Continued)

(52) U.S. Cl.
CPC ............ *G06F 30/333* (2020.01); *H01L 25/00* (2013.01); *H03K 19/00* (2013.01); *G01R 31/28* (2013.01); *G06F 11/00* (2013.01); *G06F 30/3308* (2020.01); *G06F 30/398* (2020.01); *G06F 2119/02* (2020.01)

(58) Field of Classification Search
CPC .. G06F 30/333; G06F 30/3308; G06F 30/398; G06F 2119/02; G06F 11/00; H03K 19/00; H01L 25/00; G01R 31/28

USPC ...... 716/106, 111, 136; 326/16, 41, 47, 101; 714/30, 726, 729; 703/15
See application file for complete search history.

(56) References Cited

U.S. PATENT DOCUMENTS 5,329,533 A * 7/1994 Lin ................ G01R 31/318586
714/727
5,852,617 A * 12/1998 Mote, Jr. ............... G06F 11/221
714/726
(Continued)

FOREIGN PATENT DOCUMENTS

| JP | 2010-038874 A | 2/2010 |
| JP | 2012-185127 A | 9/2012 |
| JP | 5017058 B2 | 9/2012 |

OTHER PUBLICATIONS

Browy et al., "A Top-Down Approach to IC Design—Integrated Circuit Design Methodology Guide, v1.4", http://www.gnu.org, 2014, 369 pages. (Year: 2014).*

(Continued)

*Primary Examiner* — Phallaka Kik

(57) ABSTRACT

According to one embodiment, a semiconductor integrated circuit includes: a logic circuit including: a first scan chain and a second scan chain; a clock generator; and a test control circuit. The first scan chain includes: a first flip-flop having a first scan data input terminal and a first output terminal; and a first multiplexer. The first multiplexer is configured to electrically couple the first scan data input terminal to the first output terminal based on a first signal received from the test control circuit to form a first closed loop. The second scan chain includes a second flip-flop having a second scan data input terminal and a third output terminal that is not coupled to the second scan data input terminal.

20 Claims, 10 Drawing Sheets

(51) Int. Cl.
*G06F 30/398* (2020.01)
*G06F 11/00* (2006.01)
*H03K 19/00* (2006.01)
*H01L 25/00* (2006.01)
*G01R 31/28* (2006.01)
*G06F 119/02* (2020.01)

(56) References Cited

U.S. PATENT DOCUMENTS

| | | | |
|---|---|---|---|
| 5,909,451 A * | 6/1999 | Lach | G01R 31/318594 714/726 |
| 8,086,889 B2 | 12/2011 | Ito et al. | |
| 2006/0041802 A1* | 2/2006 | Grise | G01R 31/318555 714/724 |
| 2007/0283201 A1* | 12/2007 | Grise | H03K 3/35625 714/724 |
| 2010/0088561 A1* | 4/2010 | Grise | G01R 31/318541 714/731 |
| 2014/0195196 A1* | 7/2014 | Charlebois | G06F 11/348 702/182 |
| 2018/0074122 A1* | 3/2018 | Payne | G01R 31/318536 |

OTHER PUBLICATIONS

Crouch, Design-for-Test for Digital IC's and Embedded Core Systems, Prentice Hall, 1999, 28 pages. (Year: 1999).*
Kurup et al., "Logic Synthesis Using Synopsis", Springer Science+ Business Media, 1995, 45 pages. (Year: 1995).*
Tahoori, "Testing Digital Systems II", https://cdnc.itec.kit.edu/downloads/tds2_ws1011_lecture3.pdf, 2010, 17 pages. (Year: 2010).*

* cited by examiner

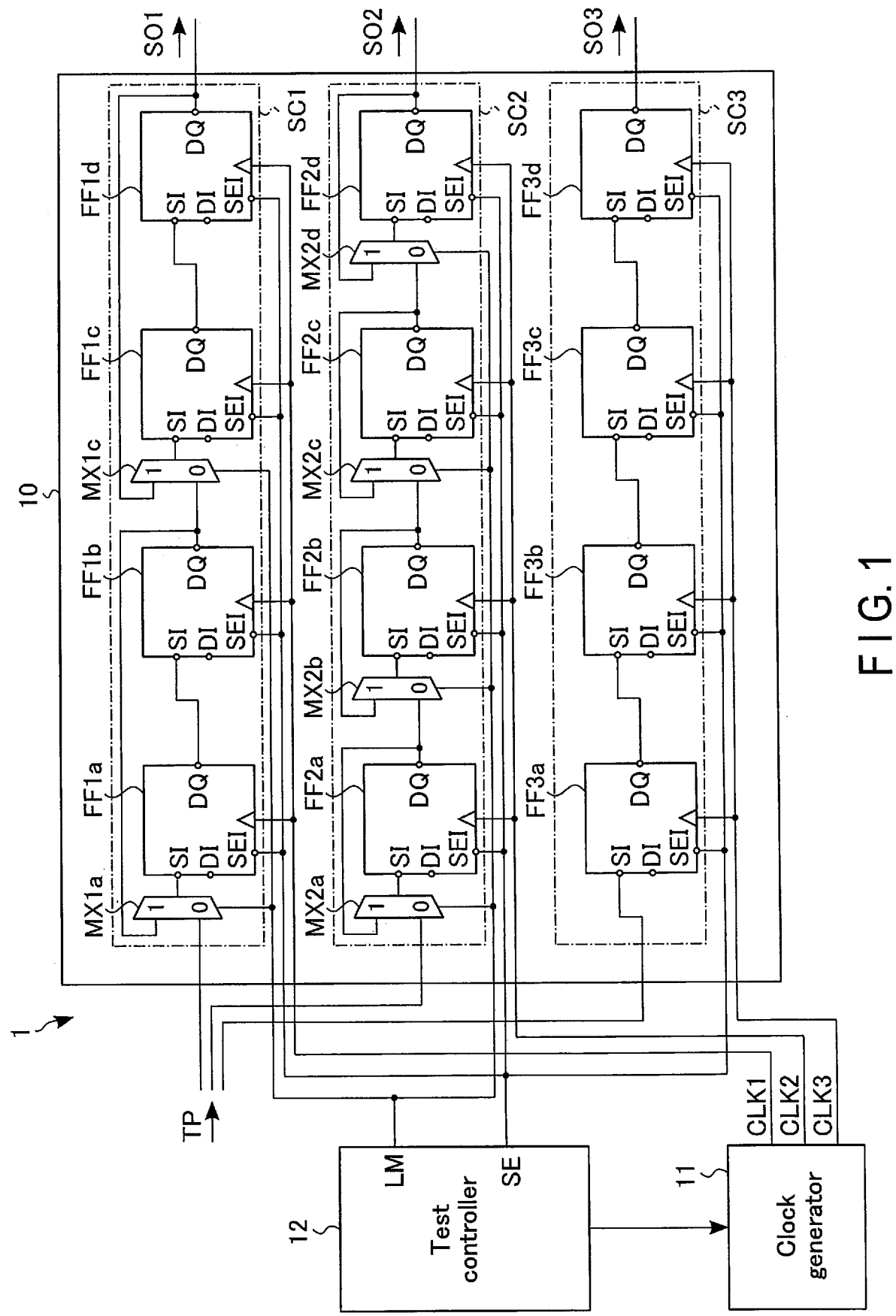
F I G. 1

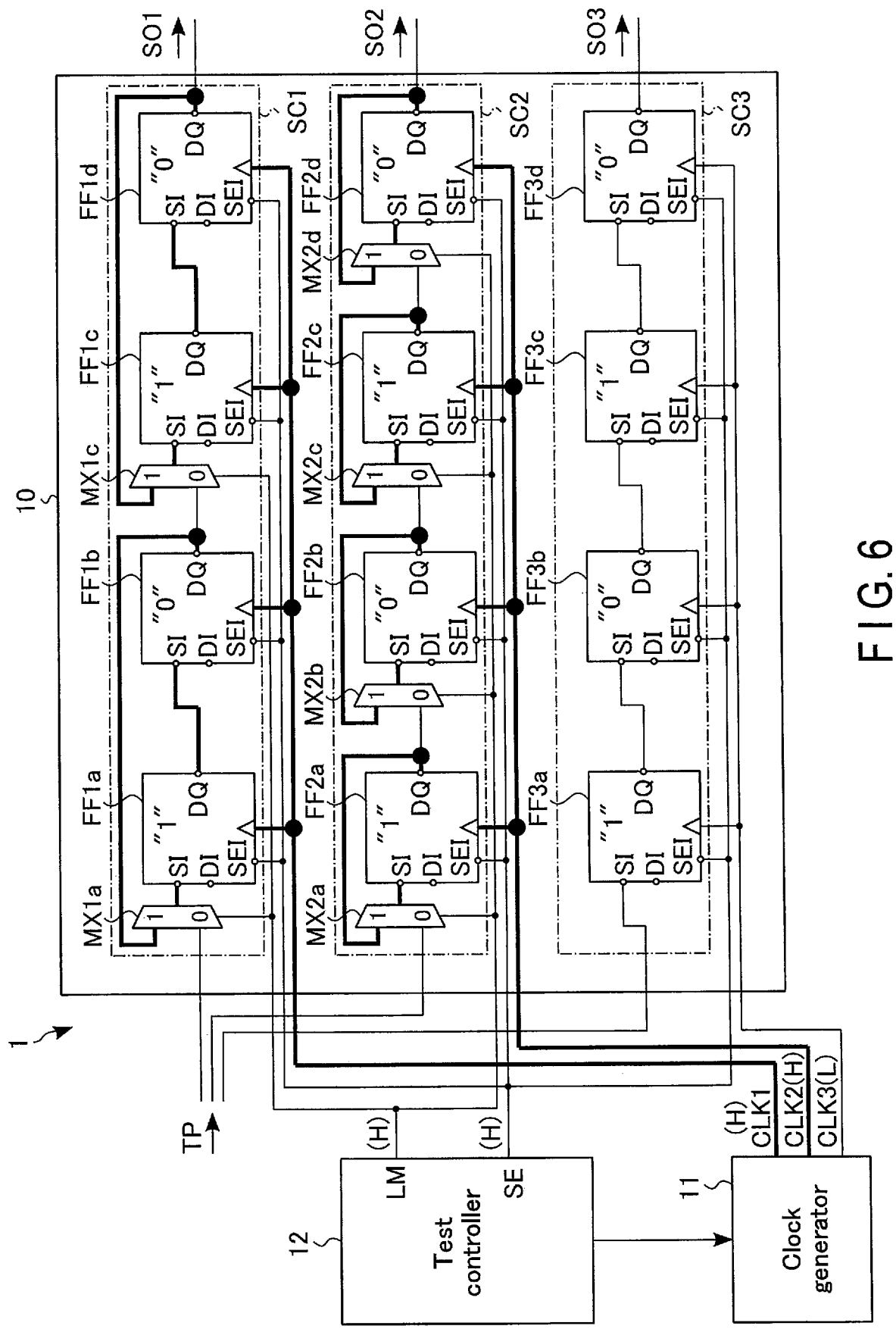
F I G. 6

SEMICONDUCTOR INTEGRATED CIRCUIT, CIRCUIT DESIGNING APPARATUS, AND CIRCUIT DESIGNING METHOD

CROSS-REFERENCE TO RELATED APPLICATIONS

This application is based upon and claims the benefit of priority from Japanese Patent Application No. 2020-040598, filed Mar. 10, 2020, the entire contents of which are incorporated herein by reference.

FIELD

Embodiments described herein relate generally to a semiconductor integrated circuit, as well as a circuit designing apparatus and circuit designing method for such a circuit.

BACKGROUND

Scan testing is known as a method for detecting a fault in the logic circuit of a semiconductor integrated circuit.

BRIEF DESCRIPTION OF THE DRAWINGS

FIG. 1 is a block diagram of a semiconductor integrated circuit according to a first embodiment.

FIGS. 4 to 6 are diagrams showing a specific example of scan chains during a loop operation in the semiconductor integrated circuit according to the first embodiment.

DETAILED DESCRIPTION

Figure 2:
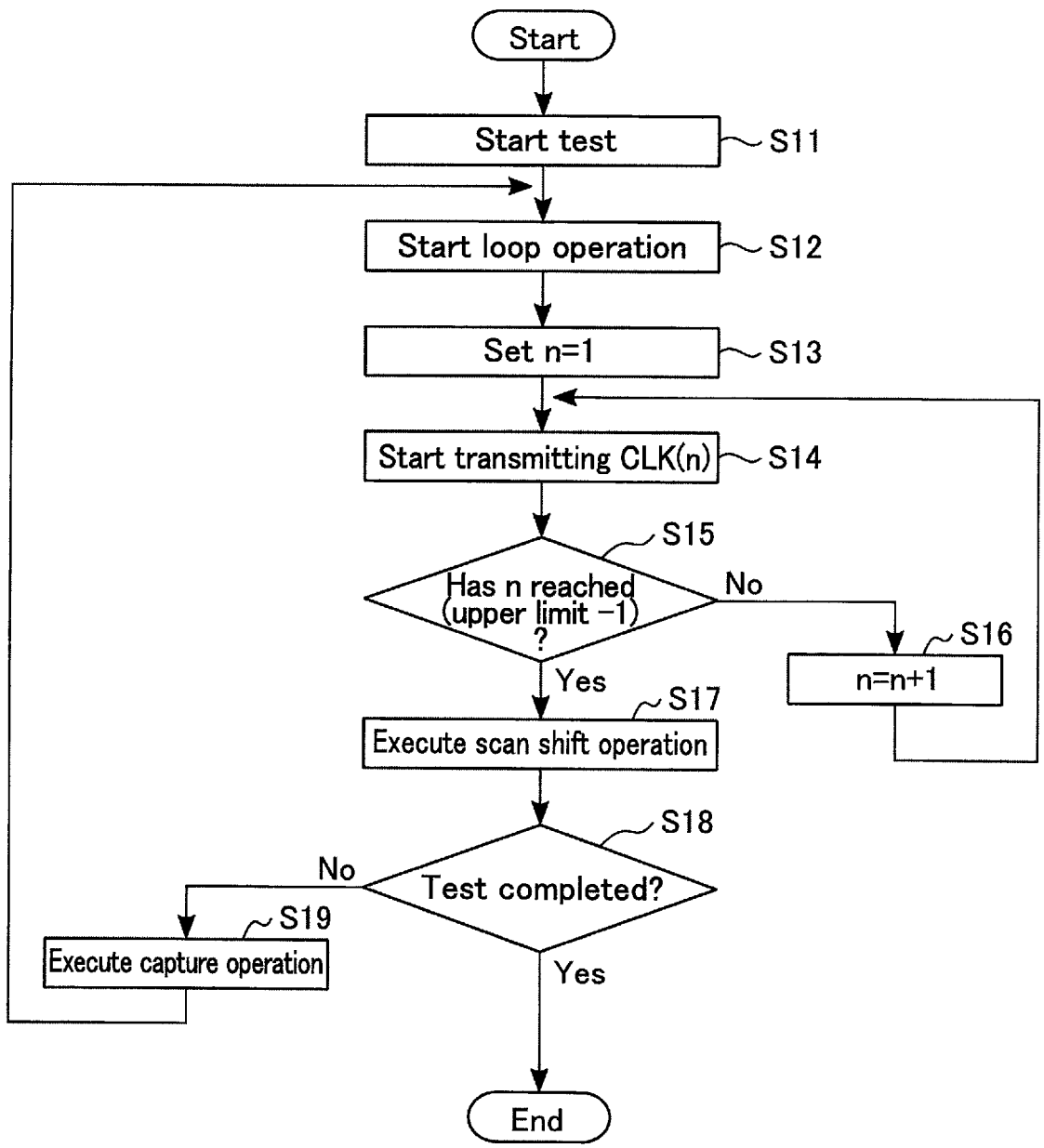
FIG. 2 is a flowchart of scan testing in the semiconductor integrated circuit according to the first embodiment.

In general, according to one embodiment, a semiconductor integrated circuit includes: a logic circuit including: a first scan chain configured to operate based on a first clock signal; and a second scan chain configured to operate based on a second clock signal different from the first clock signal; a clock generator configured to generate the first and second clock signals; and a test control circuit configured to control the first and second scan chains in a scan test. The first scan chain includes: a first flip-flop having a first scan data input terminal and a first output terminal; and a first multiplexer having a first input terminal coupled to the first output terminal, a second input terminal to which a test pattern is input, and a second output terminal coupled to the first scan data input terminal. The first multiplexer is configured to electrically couple the first scan data input terminal to the first output terminal based on a first signal received from the test control circuit to form a first closed loop. The second scan chain includes a second flip-flop having a second scan data input terminal and a third output terminal that is not coupled to the second scan data input terminal.

The embodiments of the present invention will be explained with reference to the drawings. In the following explanation, components having the same functions and structures will be referred to by the same reference symbol.

1. First Embodiment

A semiconductor integrated circuit according to the first embodiment will be explained below.

1.1 Structure

1.1.1 Structure of Semiconductor Integrated Circuit

An exemplary structure of the semiconductor integrated circuit will be described with reference to FIG. 1. FIG. 1 is a block diagram of the semiconductor integrated circuit according to the present embodiment. The example of FIG. 1 shows a schematic view of the structure when executing a scan test.

The semiconductor integrated circuit of the present embodiment executes a scan test (hereinafter may be referred to simply as a "test") of a logic circuit, for example, under the control of an external tester or based on a logic built-in self-test (LBIST) of the logic circuit in the semiconductor integrated circuit. A fault is diagnosed in the semiconductor integrated circuit based on the result of this scan test. A test executed under the control of an external tester will be described below. A scan test is executed using scan patterns (scan chains) integrated in advance in the logic circuit.

The test mainly includes a shift-in operation, a capture operation, and a shift-out operation. In the shift-in operation, a test pattern (scan data) is input to a scan chain having a plurality of flip-flops serially coupled to each other. In the capture operation, calculation processing is executed in a combination circuit coupled to the flip-flops of the scan chain, based on the values that have been set to the flip-flops in the shift-in operation, and the results of the calculation processing are fetched into the flip-flops. In the shift-out operation, the processing results fetched into the flip-flops are output. In the test, the second and subsequent shift-in operations are conducted at the same time as the shift-out operation. When a shift-in operation does not need to be distinguished from a shift-out operation, the operation will simply be referred to as a "scan shift operation".

As illustrated in FIG. 1, a semiconductor integrated circuit 1 includes a logic circuit 10, a clock generator 11, and a test controller 12.

For example, the logic circuit 10 executes various types of calculation processing to execute tasks. During a test, a plurality of scan chains SC are provided in the logic circuit 10. Furthermore, during the test, the logic circuit 10 receives different clock signals CLK. In the example of FIG. 1, three scan chains SC1 to SC3 are provided in the logic circuit 10. The scan chains SC1 to SC3 operate in accordance with the clock signals CLK1 to CLK3, respectively. The structure of a scan chain will be described later in detail.

In the example of FIG. 1, one scan chain SC operates in accordance with a single clock signal CLK. However, a plurality of scan chains SC may operate in accordance with a single clock signal CLK.

The clock generator 11 generates the clock signals CLK1 to CLK3. The clock generator 11 transmits the generated clock signals CLK1 to CLK3 to the scan chains SC1 to SC3, respectively.

The test controller 12 controls the test operation of the semiconductor integrated circuit 1 based on the control signal received from an external tester. During the test, the test controller 12 controls the clock generator 11 and the scan chains SC. The test controller 12 transmits a scan enable signal SE and a loop mode signal LM to each of the scan chains SC.

The scan enable signal SE enables a test pattern TP (scan data) to be input in the flip-flops FF of the scan chain SC.

The loop mode signal LM controls multiplexers MX arranged in the scan chains SC in a loop operation executed before the scan shift operation. In the loop operation, the timings of starting the supply of the clock signals CLK1 to CLK3 are controlled so that the timings at which the corresponding flip-flops FF start the operation can vary in accordance with the clock signals CLK. The loop operation will be described later in detail.

1.1.2 Structure of Scan Chain

Next, the structure of a scan chain SC will be explained with reference to FIG. 1.

First, the structure of the scan chain SC1 will be explained. For the sake of simplicity, each scan chain SC including four flip-flops will be described, but the number of flip-flops in a scan chain SC can be freely determined.

The scan chain SC1 includes, for example, four flip-flops FF1a to FF1d and two multiplexers MX1a and MX1c.

The flip-flops FF1a to FF1d have the same structure. When the flip-flops FF1a to FF1d do not have to be distinguished from each other, they will simply be referred to as "flip-flops FF1". For example, a flip-flop FF1 includes a data input terminal DI, a scan data input terminal SI, a control signal input terminal SEI, a clock input terminal, and an output terminal DQ.

The data input terminal DI may be coupled to a sequential circuit, which is not shown in the drawings, and data corresponding to various types of calculation processing executed by the logic circuit 10 is input to the data input terminal DI. For example, the data processed by the corresponding sequential circuit is input through the input terminal DI in the capture operation.

For example, the scan data (test pattern TP) is input to the scan data input terminal SI.

A scan enable signal SE is input to the control signal input terminal SEI. For example, when the scan enable signal SE is at the high ("H") level, the data of the scan data input terminal SI is fetched into the flip-flop FF1. On the other hand, when the scan enable signal SE is at the low ("L") level, the data of the data input terminal DI is fetched into the flip-flop FF1.

The clock signal CLK1 is input to the clock input terminal. The data is fetched into the flip-flop FF1, for example, at the timing of the clock signal CLK1 rising from the "L" level to the "H" level.

Data is output from the output terminal DQ.

The multiplexers MX1a and MX1c have the same structure. Hereinafter, when the multiplexers MX1a and MX1c do not have to be distinguished from each other, they will simply be referred to as "multiplexers MX1". For example, the multiplexer MX1 includes an input terminal ("1"), an input terminal ("0"), a control signal input terminal, and an output terminal. A loop mode signal LM is input to the control signal input terminal of the multiplexer MX1. When the loop mode signal LM is at the "H" level (data "1"), the input terminal ("1") is selected. On the other hand, when the loop mode signal LM is at the "L" level (data "0"), the input terminal ("0") is selected.

The input terminal ("1") of the multiplexer MX1a is connected to the output terminal DQ of the flip-flop FF1b. A test pattern TP is input to the input terminal ("0") of the multiplexer MX1a. The output terminal of the multiplexer MX1a is coupled to the scan data input terminal SI of the flip-flop FF1a. The output terminal DQ of the flip-flop FF1a is coupled to the scan data input terminal SI of the flip-flop FF1b.

The flip-flop FF1c, flip-flop FF1d and multiplexer MX1c are coupled to each other in the same manner as the coupling of the flip-flop FF1a, flip-flop FF1b and multiplexer MX1a. The input terminal ("1") of the multiplexer MX1c is coupled to the output terminal DQ of the flip-flop FF1d. The input terminal ("0") of the multiplexer MX1c is coupled to the output terminal DQ of the flip-flop FF1b. The output terminal of the multiplexer MX1c is coupled to the scan data input terminal SI of the flip-flop FF1c. The output terminal DQ of the flip-flop FF1c is coupled to the scan data input terminal SI of the flip-flop FF1d. The output data SO1 of the scan chain SC1 is output from the output terminal DQ of the flip-flop FF1d.

For example, when the scan enable signal is at the "H" level and the loop mode signal LM is at the "H" level, a closed loop of the flip-flops FF1a and FF1b and another closed loop of the flip-flops FF1c and FF1d are formed. In this case, the output data of the flip-flop FF1a is fetched into the flip-flop FF1b, and the output data of the flip-flop FF1b is fetched into the flip-flop FF1a at the rising timing of the clock signal CLK1.

Furthermore, the output data of the flip-flop FF1c is fetched into the flip-flop FF1d, and the output data of the flip-flop FF1d is fetched into the flip-flop FF1c. Accordingly, each loop completes a round in two cycles during which the clock signal CLK1 rises twice, as a result of which the same data as the one prior to the loop is held in each of the flip-flops FF1a to FF1d. Hereinafter, a closed loop formed by two flip-flops FF may be referred to as a "two-step loop". In the two-step loop, the data returns to the original flip-flop FF in two cycles of clock signal CLK1. That is, when a clock signal CLK having the same number of cycles as the number of steps in the closed loop is received, the data is returned to the original flip-flop FF.

Next, the structure of the scan chain SC2 will be explained.

The scan chain SC2 includes, for example, four flip-flops FF2a to FF2d and four multiplexers MX2a to MX2d.

Each of the flip-flops FF2a to FF2d has the same structure as that of the flip-flop FF1. If the flip-flops FF2a to FF2d do not have to be distinguished from each other, they will simply be referred to as "flip-flops FF2".

The clock signal CLK2 is input to the clock input terminals of the flip-flops FF2. The data is fetched into the flip-flops FF2, for example, at the timing of the clock signal CLK2 rising from the "L" level to the "H" level.

Each of the multiplexers MX2a to MX2d has the same structure as that of the multiplexer MX1. Hereinafter, when the multiplexers MX2a to MX2d do not have to be distinguished from each other, they will simply be referred to as "multiplexers MX2". Further, when the multiplexers MX1 and MX2 do not have to be distinguished from each other, they will simply be referred to as "multiplexers MX".

The input terminal ("1") of the multiplexer MX2a is coupled to the output terminal DQ of the flip-flop FF2a. A test pattern TP is input to the input terminal ("0") of the multiplexer MX2a. The output terminal of the multiplexer MX2a is coupled to the scan data input terminal SI of the flip-flop FF2a.

The flip-flop FF2b and multiplexer MX2b, the flip-flop FF2c and multiplexer MX2c, and the flip-flop FF2d and multiplexer MX2d are respectively coupled to each other in the same manner as in the coupling of the flip-flop FF2a and multiplexer MX2a. The input terminal ("0") of the multiplexer MX2b is coupled to the output terminal DQ of the flip-flop FF2a. The input terminal ("0") of the multiplexer MX2c is coupled to the output terminal DQ of the flip-flop FF2b. The input terminal ("0") of the multiplexer MX2d is coupled to the output terminal DQ of the flip-flop FF2c. The output data SO2 of the scan chain SC2 is output from the output terminal DQ of the flip-flop FF2d.

For example, when the scan enable signal is at the "H" level and the loop mode signal LM is at the "H" level, a closed loop is formed by each of the flip-flops FF2. In this case, the data in the flip-flop FF2 is maintained regardless of the number of rising times of the clock signal CLK2. Hereinafter, a closed loop formed by a single flip-flop FF may be referred to as a "one-step loop".

Next, the structure of the scan chain SC3 will now be explained.

The scan chain SC3 may include four flip-flops FF3a to FF3d.

The flip-flops FF3a to FF3d have the same structure as that of the flip-flop FF1. If the flip-flops FF3a to FF3d do not have to be distinguished from each other, they will simply be referred to as "flip-flops FF3". If the flip-flops FF1, FF2, and FF3 do not have to be distinguished from each other, they will simply be referred to as "flip-flops FF".

The clock signal CLK3 is input to the clock input terminal of the flip-flop FF3. The data may be fetched into the flip-flop FF3 at the timing of the clock signal CLK3 rising from the "L" level to the "H" level.

A test pattern TP is input to the scan data input terminal SI of the flip-flop FF3a. The output terminal DQ of the flip-flop FF3a is coupled to the scan data input terminal SI of the flip-flop FF3b. The output terminal DQ of the flip-flop FF3b is coupled to the scan data input terminal SI of the flip-flop FF3c. The output terminal DQ of the flip-flop FF3c is coupled to the scan data input terminal SI of the flip-flop FF3d. The output data SO3 of the scan chain SC3 is output from the output terminal DQ of the flip-flop FF3d.

The flip-flops FF3 do not form a closed loop. In other words, in each of the flip-flops FF3, the scan data input terminal SI is not coupled to the output terminal DQ.

1.2 Test 1.2.1 Flow of Test

Next, the flow of the test will be explained with reference to FIG. 2, which is a flowchart indicating the flow of the test. In this description, the number of the clock signal CLK is represented by variable n (1≤n≤3). The variable n is held, for example, by a counter provided in the test controller 12, and incremented under the control of the test controller 12.

As illustrated in FIG. 2, for example, upon receipt of a control signal from an external tester, the test controller 12 start the test (step S11).

The test controller 12 first starts the loop operation (step S12). The test controller 12 sets the loop mode signal LM and scan enable signal SE to the "H" level. In the scan chain SC1, a closed loop is formed by two flip-flops FF1a and FF1b, and another closed loop is formed by two flip-flops FF1c and FF1d. In the scan chain SC2, a closed loop is formed in each of the flip-flops FF2.

The test controller 12 sets n=1 (step S13). In response, the clock generator 11 starts a transmission of the clock signal CLK1 to the scan chain SC1 (step S14).

The test controller 12 confirms whether the variable n reaches (upper limit minus 1) (step S15). More specifically, the upper limit of the variable n is 3 in this embodiment, and therefore the test controller 12 confirms whether the variable n is 2.

If the variable n has not yet reached (upper limit minus 1) ("no" at step S15), or in other words if the variable n=1, the test controller 12 increments the variable n to n=n+1 (step S16), and the process returns to step S14. More specifically, by setting variable n=2, the test controller 12 returns to step S14 and starts a transmission of the clock signal CLK2. That is, the clock generator 11 transmits the clock signals CLK1 and CLK2 to the scan chains SC1 and SC2, respectively.

If the variable n has reached (upper limit minus 1) ("yes" at step S15), the test controller 12 terminates the loop operation, and executes a scan shift operation (step S17). More specifically, the test controller 12 sets the loop mode signal LM to the "L" level. The clock generator 11 transmits the clock signals CLK1 to CLK3 to the scan chains SC1 to SC3, respectively. The scan shift operation is thereby executed in each of the scan chains SC. The output data SO1 to SO3 from the scan chains SC is transmitted to an external tester.

If the test has not yet been completed ("no" at step S18), the test controller 12 sets the scan enable signal SE to the "L" level to execute the capture operation (step S19). After the capture operation, the process returns to step S12.

When the test is completed (yes at step S18), the test controller 12 sets the loop mode signal LM and scan enable signal SE to the "L" level. The clock generator 11 terminates the transmission of the clock signals CLK1 to CLK3.

1.2.2 Timing Chart of Signals During Test

Figure 3:
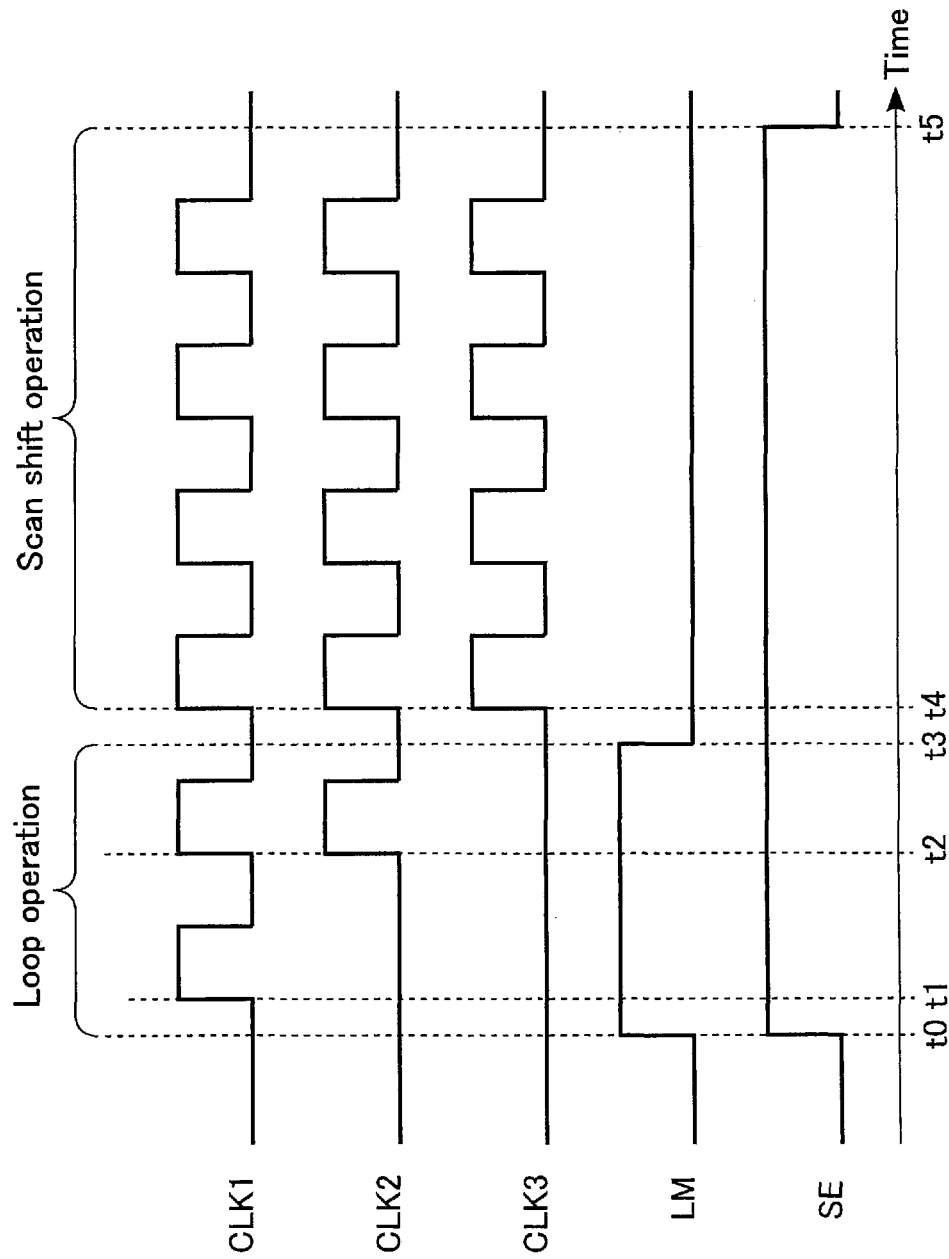
FIG. 3 is a timing chart of various signal lines during scan testing in the semiconductor integrated circuit according to the first embodiment.

Next, the timings of signals during the test will be explained with reference to FIG. 3. FIG. 3 is a timing chart of the clock signals CLK1 to CLK3, loop mode signal LM, and scan enable signal SE during the test. In the example of FIG. 3, the timings during the loop operation and scan shift operation are indicated, while the timings during the capture operation are omitted for the sake of simplicity.

As indicated in FIG. 3, the period between times t0 and t3 corresponds to the loop operation, and the period between times t4 and t5 corresponds to the scan shift operation.

First, at time t0, the test controller 12 sets the loop mode signal LM and scan enable signal SE to the "H" level, as a result of which the loop operation is started.

At time t1, the clock generator 11 generates a one-cycle clock signal CLK1 and transmits the signal to the scan chain SC1. During the period between times t1 and t2, the flip-flops FF1 of the scan chain SC1 are operated, while the flip-flops FF2 of the scan chain SC2 and the flip-flops FF3 of the scan chain SC3 are not operated.

At time t2, the clock generator 11 generates one-cycle clock signals CLK1 and CLK2, and transmits the signals to the scan chains SC1 and SC2, respectively. Here, the clock signals CLK1 and CLK2 are synchronized with each other. During the period between times t2 and t3, the flip-flops FF1 of the scan chain SC1 and the flip-flops FF2 of the scan chain SC2 are operated, while the flip-flops FF3 of the scan chain SC3 are not operated.

At time t3 after the pulses of the clock signals CLK1 and CLK2 fall from the "H" level to the "L" level, the test controller 12 sets the loop mode signal LM to the "L" level. The loop operation is thereby completed. During the loop operation, the clock generator 11 transmits a clock signal CLK having a number of cycles corresponding to the number of steps in the loop, to each scan chain SC. The clock generator 11 therefore does not transmit a clock signal CLK3 to the scan chain SC3, which does not form a closed loop, during the loop operation.

During the period between times t4 and t5, the clock generator 11 generates clock signals CLK1 to CLK3 that are synchronous with each other, and transmits the signals to the scan chains SC1 to SC3, respectively. In each of the scan chains SC1 to SC3, the scan shift operation is executed based on the respective clock signals CLK1 to CLK3. During the period between times t4 and t5, the flip-flops FF1 of the scan chain SC1, the flip-flops FF2 of the scan chain SC2, and the flip-flops FF3 of the scan chain SC3 are operated. In the example of FIG. 3, four flip-flops FF are included in each of the scan chains SC1 to SC3, and four-cycle clock signals CLK1 to CLK3 are generated for respective scan chains during the period between times t4 and t5.

1.2.3 Specific Example of Loop Operation

Next, a specific example of the loop operation will be explained with reference to FIGS. 4 to 7, which show the flow of the clock signals and data in the loop operation. The example of FIGS. 4 to 7 corresponds to the operations at times t0, t1, t2 and t4, respectively, in FIG. 3.

Figure 4:
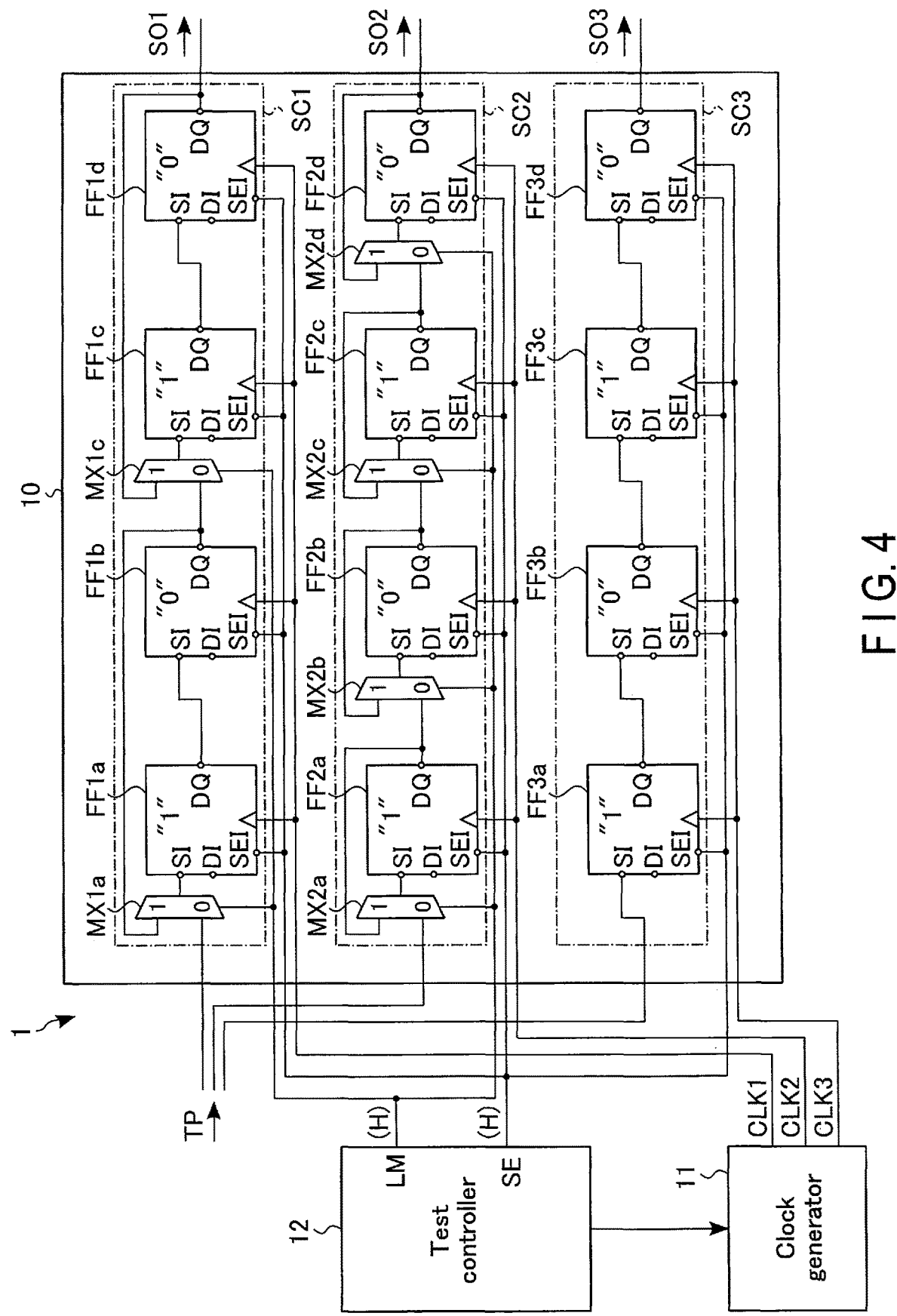

As illustrated in FIG. 4, in the scan chain SC1, for example, the flip-flops FF1a and FF1c hold data "1", and the flip-flops FF1b and FF1d hold data "0". In the scan chain SC2, for example, the flip-flops FF2a and FF2c hold data "1", and the flip-flops FF2b and FF2d hold data "0". In the scan chain SC3, for example, the flip-flops FF3a and FF3c hold data "1", and the flip-flops FF3b and FF3d hold data "0". That is, each of the scan chains SC holds the same data "1010". In the example of FIG. 4, the scan chains SC1 to SC3 hold the same data for the sake of simplicity, but the data may differ among the scan chains SC.

Under the condition of FIG. 4, the test controller 12 sets the loop mode signal LM and scan enable signal SE to the "H" level (at time t0 in FIG. 3).

Figure 5:
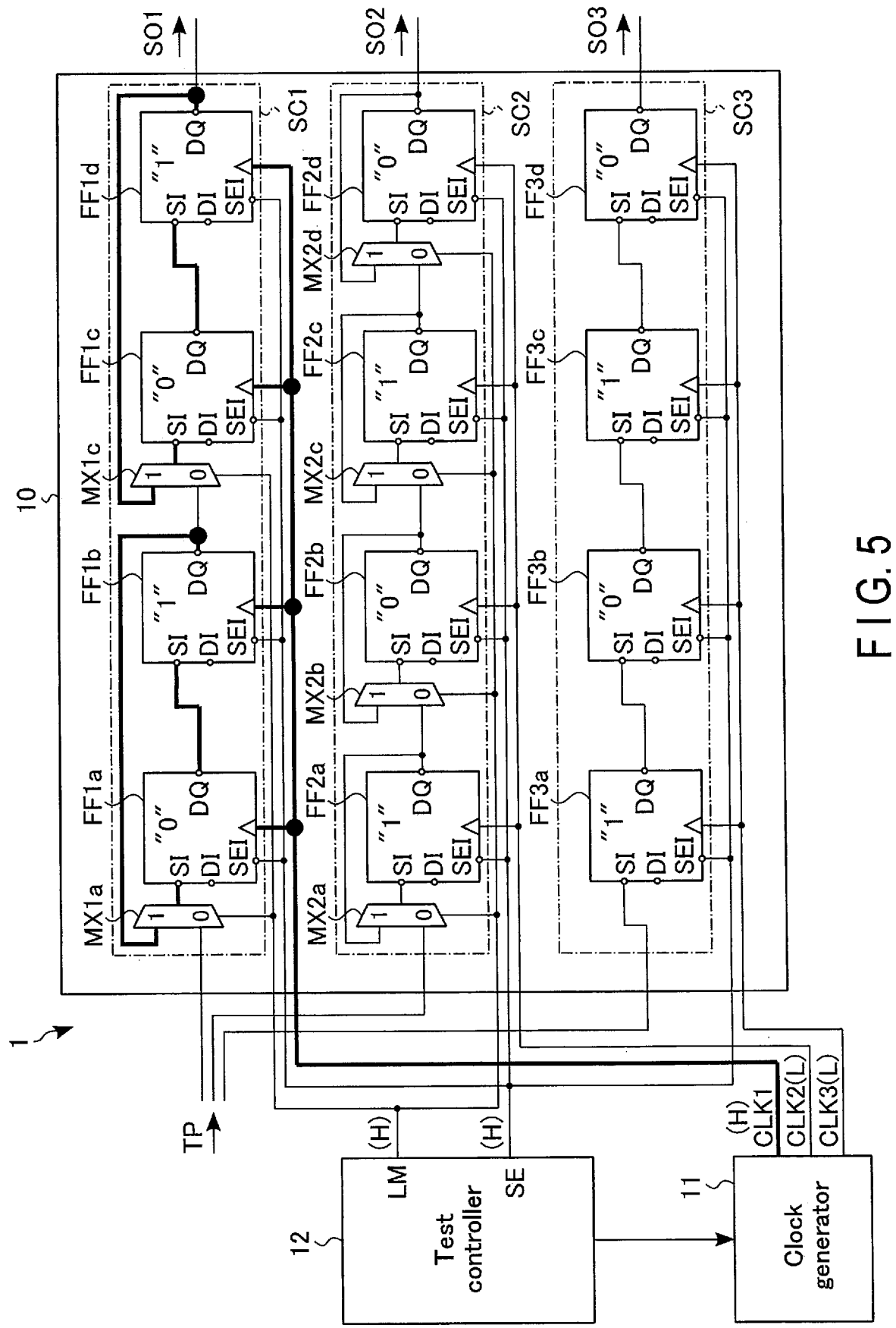

As indicated in FIG. 5, the clock generator 11 generates one cycle of the clock signal CLK1, and transmits it to the scan chain SC1 (at time t1 in FIG. 3). In the scan chain SC1, the flip-flop FF1a fetches the data "0" from the flip-flop FF1b at the timing of the clock signal CLK1 rising. The flip-flop FF1b fetches the data "1" from the flip-flop FF1a. The flip-flop FF1c fetches the data "0" from the flip-flop FF1d. The flip-flop FF1d fetches the data "1" from the flip-flop FF1c. In other words, the data of the flip-flop FF1a is interchanged with the data of the flip-flop FF1b, and the data of the flip-flop FF1c is interchanged with the data of the flip-flop FF1d.

As illustrated in FIG. 6, the clock generator 11 generates one cycle of clock signals CLK1 and CLK2 each, and transmits them to the scan chains SC1 and SC2 (at time t2 in FIG. 3). In the scan chain SC1, the flip-flop FF1a fetches the data "1" from the flip-flop FF1b at the timing of the clock signal CLK1 rising. The flip-flop FF1b fetches the data "0" from the flip-flop FF1a. The flip-flop FF1c fetches the data "1" from the flip-flop FF1d. The flip-flop FF1d fetches the data "0" from the flip-flop FF1c. In other words, each of the flip-flops FF1 in the scan chain SC1 returns to the state of holding the data of time t0.

In the scan chain SC2, a closed loop is formed by each of the flip-flops FF2. The flip-flops FF2 therefore maintain the respective data.

Figure 7:
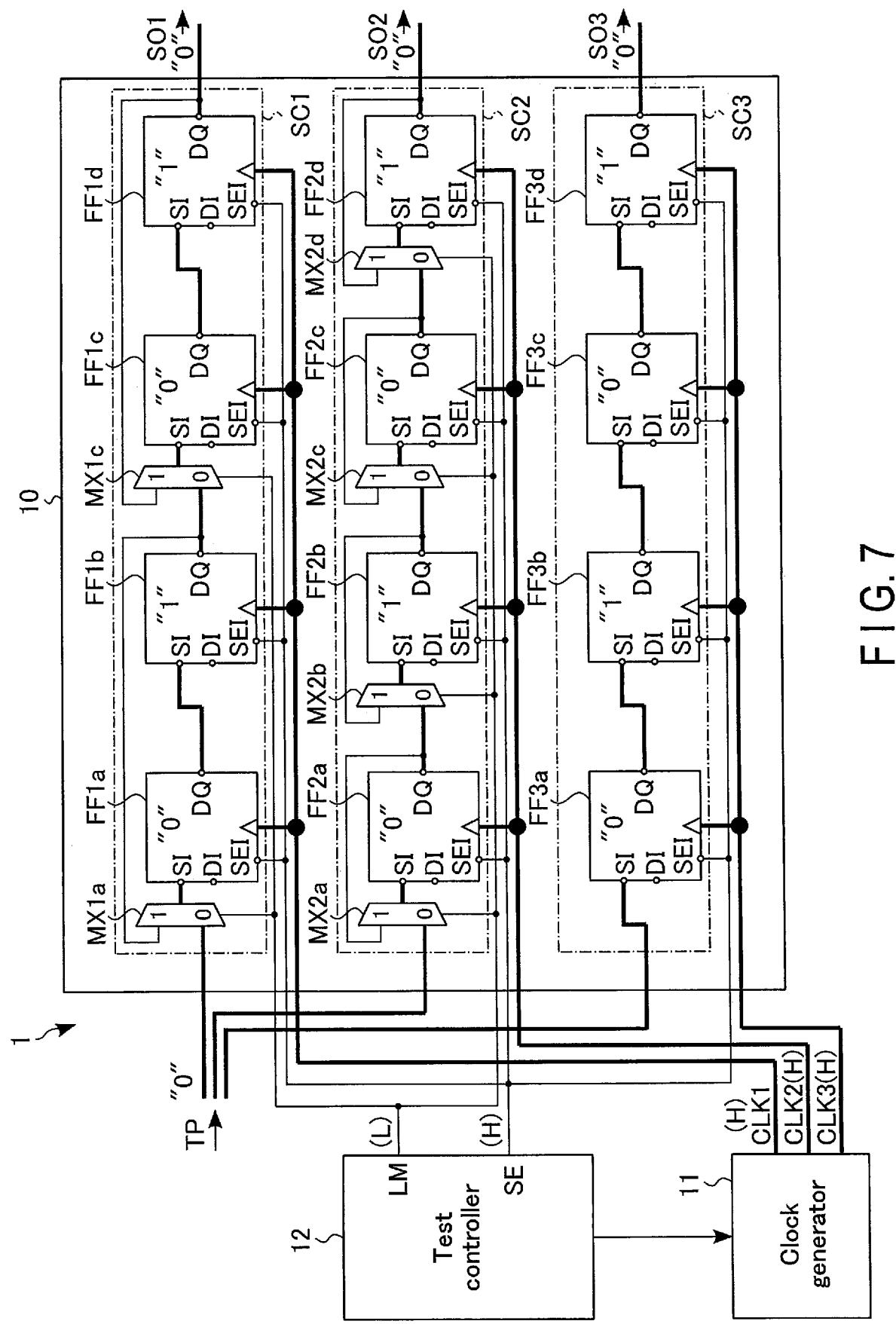
FIG. 7 is a diagram showing a specific example of the scan chains during a scan shift operation in the semiconductor integrated circuit according to the first embodiment.

As illustrated in FIG. 7, the test controller 12 sets the loop mode signal LM to the "L" level in the scan shift operation. The clock generator 11 generates the clock signals CLK1 to CLK3, and transmits them to the scan chains SC1 to SC3, respectively (at time t4 in FIG. 3). For example, in the scan chain SC1, if the first data of the test pattern TP is data "0", the flip-flop FF1a fetches the data "0" of the test pattern TP at the timing of the clock signal CLK1 rising. The data "1" in the flip-flop FF1a is shifted to the flip-flop FF1b. The data "0" in the flip-flop FF1b is shifted to the flip-flop FF1c. The data "1" in the flip-flop FF1c is shifted to the flip-flop FF1d. The data "0" in the flip-flop FF1d is output as output data S01. In a similar manner, in the scan chain SC2, the flip-flop FF2a fetches the data "0" of the test pattern TP at the timing of the clock signal CLK2 rising. The data "1" in the flip-flop FF2a is shifted to the flip-flop FF2b. The data "0" in the flip-flop FF2b is shifted to the flip-flop FF2c. The data "1" in the flip-flop FF2c is shifted to the flip-flop FF2d. The data "0" in the flip-flop FF2d is output as output data S02. Furthermore, in the scan chain SC3, the flip-flop FF3a fetches the data "0" of the test pattern TP at the timing of the clock signal CLK3 rising. The data "1" in the flip-flop FF3a is shifted to the flip-flop FF3b. The data "0" in the flip-flop FF3b is shifted to the flip-flop FF3c. The data "1" in the flip-flop FF3c is shifted to the flip-flop FF3d. The data "0" in the flip-flop FF3d is output as output data S03.

1.3 Effects of First Embodiment

The structure according to the present embodiment suppresses an increase of the power consumption during the test. This effect is now discussed in detail.

In the scan shift operation of a test, all the flip-flops included in the scan chains start operations in synchronization with a single clock signal. This rapidly increases the power consumption at the start of the scan shift operation. The sharp increase of the power consumption may cause an IR drop, which reduces the power supply voltage (hereinafter may be referred to as a "droop"). Once a droop occurs, errors may be caused in the fault detection in the test. In addition, noise may be produced in signals, or instantaneous power interruption may occur due to a decrease in the power supply voltage.

In contrast, the structure according to the present embodiment executes a loop operation before the scan shift operation in order to differentiate the timings of the flip-flops FF starting the operation. More specifically, the structure according to the present embodiment includes a plurality of scan chains SC, which operate based on a respective one of clock signals CLK. Such a structure executes a loop operation prior to the scan shift operation so that the timings of starting the supply of clock signals CLK can be differentiated. Furthermore, in the structure according to the present embodiment, closed loops can be formed by one or more flip-flops FF in the scan chains SC in accordance with the number of cycles of the clock signal CLK in the loop operation. In this manner, without changing the data held in the flip-flops FF, the timings of the flip-flops FF starting their operations can be divided into several groups. As a result, the rapid increase of the power consumption at the time of starting the scan shift operation is suppressed, and the droop can be reduced.

In the structure according to the present embodiment, a plurality of clock signals CLK can be synchronized with each other during the scan shift operation. This can suppress variance in the timings of the shift-in operation and shift-out operation among the scan chains SC. With the timings of the scan chains SC synchronized, the stability of the scan shift operation can be enhanced.

In addition, with the structure according to the present embodiment, the data is maintained within each closed loop during the loop operation, and therefore the results (data) of the capture operation can be maintained. Furthermore, with the data maintained during the loop operation, the scan shift operation can be executed without changing a test pattern TP. The structure according to the present embodiment suppresses a rapid increase of the power consumption during the test. Thus, erroneous judgment can be suppressed in the test, and the reliability of the test can be enhanced.

In the explanation of the above embodiment, the semiconductor integrated circuit 1 executes the scan test under the control of an external tester. The semiconductor integrated circuit 1, however, may be adaptable to the LBIST. In this case, for example, the semiconductor integrated circuit 1 includes a pseudo random pattern generator (PRPG) and a multiple input signature register (MISR). For example, the test controller 12 transmits initial data to the PRPG. The PRPG generates a test pattern TP based on the initial data. The generated test pattern TP is transmitted to the respective scan chains SC. The output data SO1 to SO3 of the scan chains SC is transmitted to the MISR. The test controller 12 may compare the data received from the MISR with an expected value (value obtained when the test results are normal) based on the initial data transmitted to the PRPG, and determine a fault based on the comparison results.

2. Second Embodiment

Next, the second embodiment will be explained. The explanation of the second embodiment will focus on a circuit designing apparatus for designing the semiconductor integrated circuit of the first embodiment, in which a test circuit is inserted.

2.1 Hardware Structure of Circuit Designing Apparatus

Figure 8:
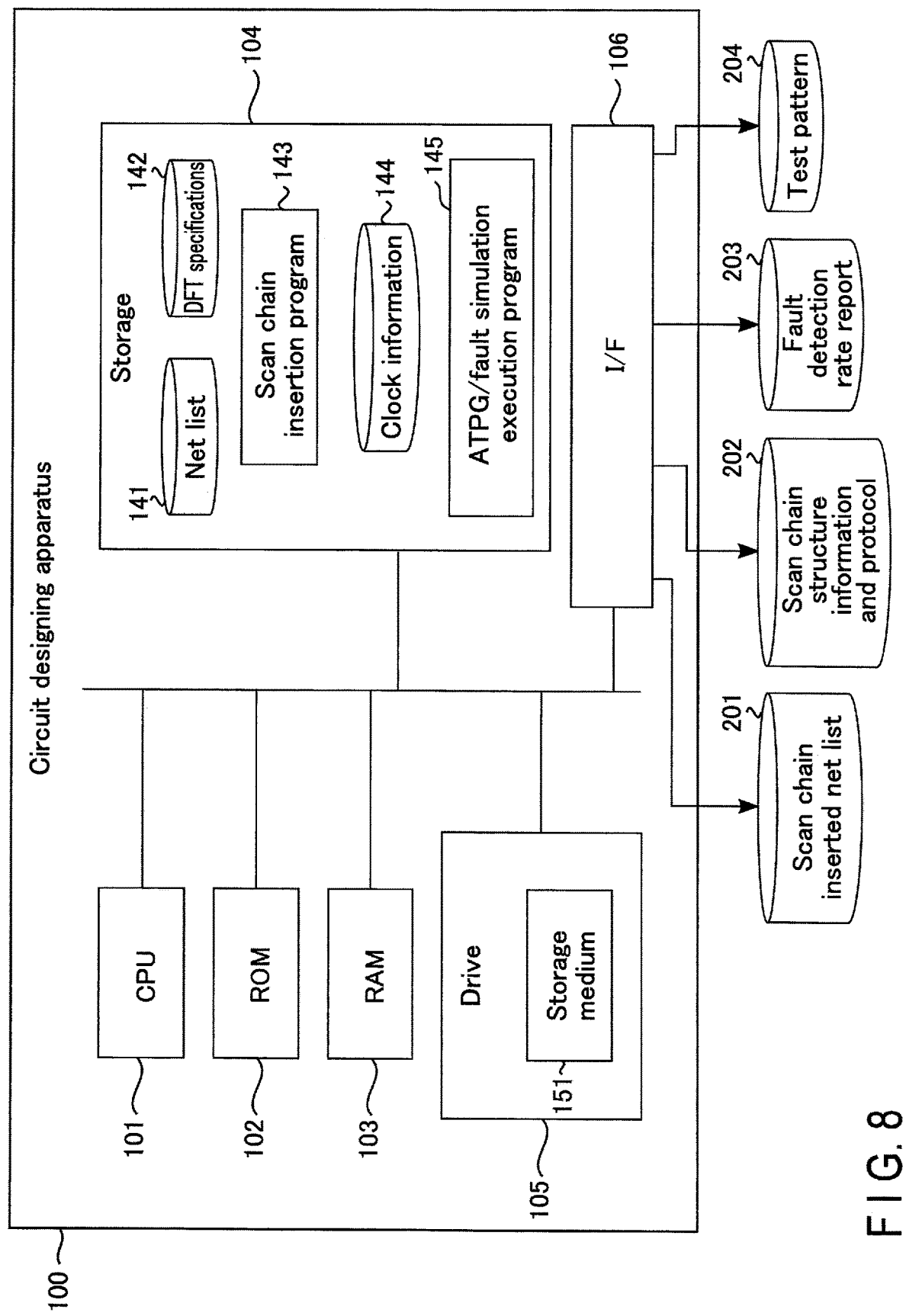
FIG. 8 is a block diagram showing the hardware structure of a circuit designing apparatus according to a second embodiment.

First, an exemplary structure of the circuit designing apparatus will be described with reference to FIG. 8. FIG. 8 is a block diagram showing the hardware structure of the circuit designing apparatus.

As illustrated in FIG. 8, the circuit designing apparatus 100 includes a CPU 101, a read only memory (ROM) 102, a random access memory (RAM) 103, a storage 104, a drive 105, and an interface 106. The circuit designing apparatus 100 has a function of, at the stage of designing the circuits of the semiconductor chip such as LSI, inserting circuits required for executing the scan test of the first embodiment and circuits of scan chains SC, and thereby generating a net list.

The CPU 101 executes various processing programs stored in the ROM 102, and uses the RAM 103 as a working area to control the entire operation of the circuit designing apparatus 100.

The storage 104 is an auxiliary storage device such as a hard disk drive (HDD) and a solid state drive (SSD). In the storage 104, a scan chain insertion program 143 is stored to be executed in the circuit designing apparatus 100. In addition, for example, a net list 141, specification information of design for testability (DFT) (hereinafter referred to as "DFT specifications") 142, and clock information 144 are stored in the storage 104 as input information for executing the scan chain insertion program 143. In the storage 104, an automatic test pattern generator (ATPG)/fault simulation execution program 145 is also stored to be executed in the circuit designing apparatus 100.

The net list 141 is the circuit data of the semiconductor integrated circuit 1. More specifically, the net list 141 includes information of conductors (i.e., net or wires) for electrically coupling various elements (logical gates such as AND circuits and exclusive OR circuits) to each other in the semiconductor chip to realize the targeted functions. In the net list 141, for example, the characteristics of signals communicated byway of each net are stored in association with the corresponding net.

The DFT specifications 142 represent information of the specifications of the design for testability that can facilitate the testing (including a scan test) of the elements in a semiconductor chip. The scan chains SC are designed in accordance with the DFT specifications.

The scan chain insertion program 143 is a program (software) to cause the circuit designing apparatus 100 to execute the process (design) for inserting the circuits (clock generator 11 and test controller 12) and scan chains SC of the first embodiment into the circuit data based on the DFT specifications 142. The scan chain insertion program 143 will be described later in detail.

The clock information 144 includes information of various clock signals for the operation of the semiconductor integrated circuit 1. For example, the clock information 144 includes the information regarding the clock signals CLK1 to CLK3 described in the first embodiment.

The ATPG/fault simulation execution program 145 is a program configured to generate a test pattern TP for testing the designed circuits and execute a fault simulation.

For example, the drive 105 is a compact disk (CD) drive, digital versatile disk (DVD) drive, etc., which serves as a device for reading programs from the storage medium 151. The type of the drive 105 may be suitably selected in accordance with the type of the storage medium 151. The above-mentioned net list 141, DFT specifications 142, scan chain insertion program 143, clock information 144, and ATPG/fault simulation execution program 145 may be stored in the storage medium 151.

The storage medium 151 is a medium for storing information such as programs through an electrical, magnetic, optical, mechanical or chemical action in a manner such that a computer or any other device or machine can read the stored information such as programs.

The interface 106 is responsible for exchanging information between the circuit designing apparatus 100 and external devices. For example, the interface 106 includes interfaces of any type such as a communication interface adopting any wired or wireless communication system, a printer, and a graphical user interface (GUI) using a display screen (e.g., liquid crystal display (LCD), electroluminescence (EL) display and cathode ray tube). The interface 106 has a function of outputting and presenting to the user a scan chain inserted net list 201, a scan chain structure information and protocol 202, a fault detection rate report 203, and a test pattern 204, which are generated by the scan chain insertion program 143 executed by the circuit designing apparatus 100. That is, the interface 106 functions as an output unit (circuit) for outputting the scan chain inserted net list 201, scan chain structure information and protocol 202, fault detection rate report 203, and test pattern 204.

The scan chain inserted net list 201 represents information of the net list after the execution of the scan chain insertion program 143.

The scan chain structure information and protocol 202 includes, as scan chain structure information, for example, the number of scan chains SC, the length of a scan chain SC (number of flip-flops FF in a scan chain SC), the list of flip-flops FF in each scan chain, the operation clock information of the flip-flops FF, information of the input terminal and output terminal of each scan chain SC, and information of closed loops formed by the flip-flops FF in the scan chains SC. If the semiconductor integrated circuit 1 is adaptable to the LBIST, the scan chain structure information also includes the circuit information of the PRPG and MISR. The scan chain structure information and protocol 202 also includes, as the protocol, information of the input/output waveform (e.g., the length of one cycle and timing of clock rising) for each test cycle of an input signal received from an external device, and input waveform of various signals in the scan shift operation.

The fault detection rate report 203 is a report on the results of fault detection obtained through the fault simulation executed in accordance with the ATPG/fault simulation execution program 145.

The test pattern 204 is the test pattern TP adopted for the fault simulation.

2.2 Functional Structure of Circuit Designing Apparatus

Figure 9:
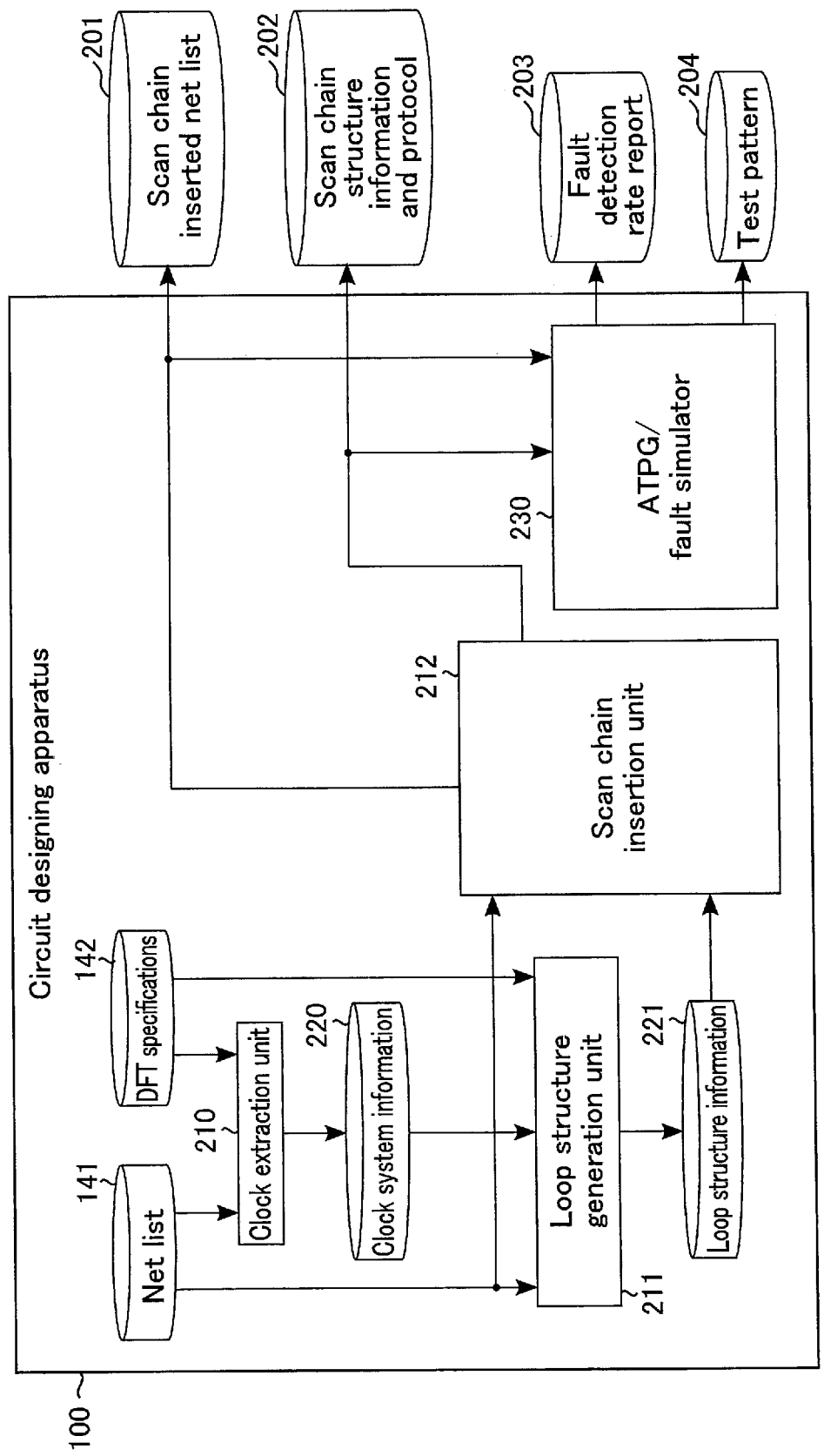
FIG. 9 is a block diagram showing the functional structure of the circuit designing apparatus according to the second embodiment.

Next, an exemplary functional structure of the circuit designing apparatus 100 will be explained with reference to FIG. 9. FIG. 9 is a block diagram for explaining the functional structure of the circuit designing apparatus 100.

The CPU 101 of the circuit designing apparatus 100 expands in the RAM 103 the scan chain insertion program 143 or ATPG/fault simulation execution program 145 stored, for example, in the storage 104. The CPU 101 interprets and executes the scan chain insertion program 143 or the ATPG/fault simulation execution program 145 expanded in the RAM 103, and thereby controls the structural components.

As illustrated in FIG. 9, when executing the scan chain insertion program 143, the circuit designing apparatus 100 functions as a computer including a clock extraction unit (i.e., extraction circuit or extractor) 210, a loop structure generation unit (i.e., generation circuit or generator) 211, and a scan chain insertion unit (i.e., insertion circuit insertor) 212. Furthermore, when executing the scan chain insertion program 143, the circuit designing apparatus 100 functions as a computer configured to generate clock system information 220 and loop structure information 221 as intermediate products through the operations of the clock extraction unit 210, loop structure generation unit 211 and scan chain insertion unit 212, and to ultimately output a scan chain inserted net list 201 and scan chain structure information and protocol 202.

The clock extraction unit 210 extracts (outputs) the clock system information 220 of various clock signals employed in the ordinary processing and testing of the design-targeted semiconductor integrated circuit 1, based on the net list 141 and DFT specifications 142, as well as the clock information 144 that is not shown in the drawings. The clock system information 220 includes, as test-related information, for example, the information of the clock signals CLK1 to CLK3. The clock extraction unit 210 transmits this clock system information 220 to the loop structure generation unit 211.

The loop structure generation unit 211 generates loop structure information 221 based on the net list 141, DFT specifications 142, clock system information 220, etc. The loop structure information 221 includes the information of the closed loops formed by the flip-flops FF of the scan chains Sc. More specifically, for example, the loop structure information 221 includes the information of a list of flip-flops FF and the number of flip-flops FF in each closed loop, information of multiplexers MX in the closed loops, information of the loop mode signal LM input to the multiplexer MX, and information of scan chains SC to which the closed loops belong. The loop structure information 221 further includes the information of the test controller 12 and clock generator 11. The loop structure generation unit 211 transmits the loop structure information 221 to the scan chain insertion unit 212.

The scan chain insertion unit 212 generates the structure of scan chains SC, based on the net list 141 and loop structure information 221. The scan chain insertion unit 212 inserts the generated scan chain SC into the net list 141, and thereby generates the scan chain inserted net list 201 and the scan chain structure information and protocol 202. The scan chain inserted net list 201 and the scan chain structure information and protocol 202 are employed for the ATPG/fault simulation, which will be described later. The scan chain insertion unit 212 outputs the scan chain inserted net list 201 and the scan chain structure information and protocol 202 to the external device.

When executing the ATPG/fault simulation execution program 145 after generating the scan chain inserted net list 201 and the scan chain structure information and protocol 202, the circuit designing apparatus 100 functions as a computer provided with the fault simulator 230. The circuit designing apparatus 100 functions as a computer configured to execute a fault simulation and output the fault detection rate report 203 and test pattern 204.

The fault simulator 230 generates a test pattern 204 for a scan test, based on the scan chain inserted net list 201 and scan chain structure information and protocol 202, and thereby executes a fault simulation. The fault simulator 230 calculates a fault detection rate based on the results of the fault simulation. The fault simulator 230 outputs the generated test pattern 204 and the fault detection rate report 203 based on the results of the fault simulation to an external device.

With the above functional structure, the circuit designing apparatus 100 can realize circuit designing and fault simulation that are adaptable to a scan test including a loop operation of the first embodiment.

The clock extraction unit 210, loop structure generation unit 211, scan chain insertion unit 212, and fault simulator 230 may be realized by circuits that are specifically designed and provided in the circuit designing apparatus 100.

2.3 Flow of Circuit Designing

Figure 10:
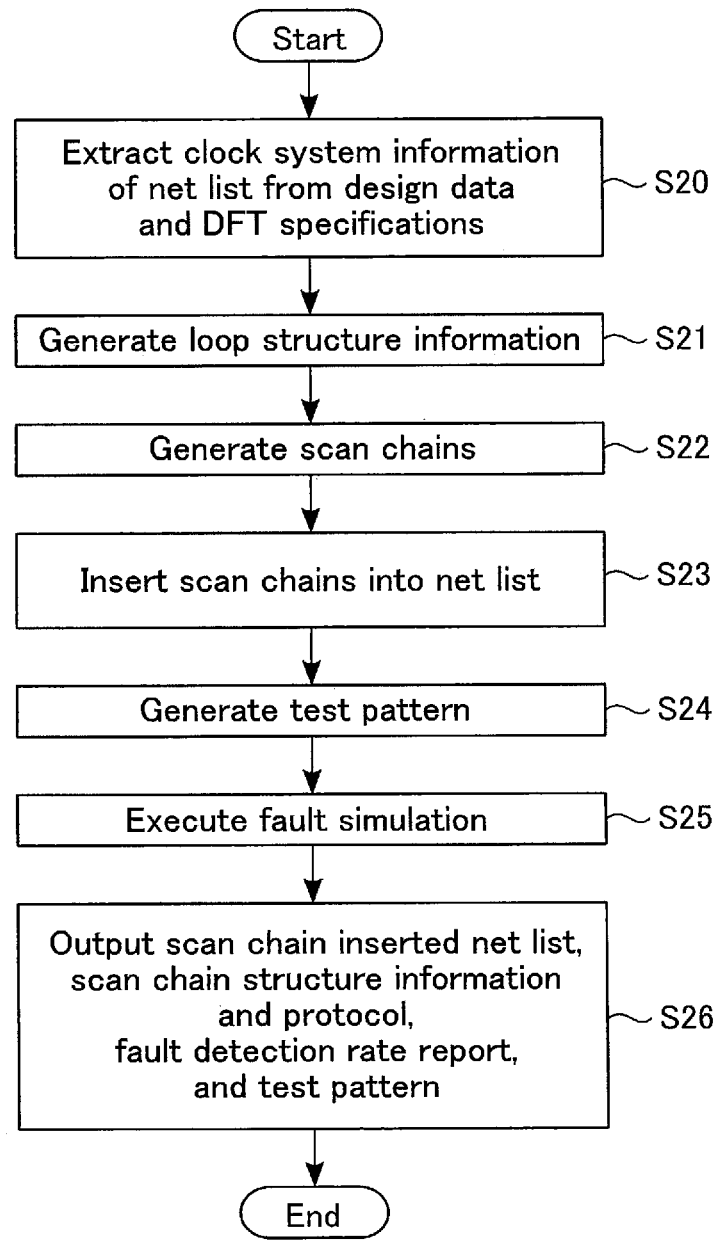
FIG. 10 is a flowchart of circuit designing on the circuit designing apparatus according to the second embodiment.

Next, the flow of circuit designing will be explained with reference to FIG. 10. FIG. 10 is a flowchart of the circuit designing.

As illustrated in FIG. 10, the CPU 101 first expands the scan chain insertion program 143 read from the storage 104, in the RAM 103. That is, the CPU 101 starts the scan chain insertion program 143.

The CPU 101 operates as the clock extraction unit 210, and extracts the clock system information 220 of the net list 141 from the design-targeted net list 141, DFT specifications 142, clock information 144 and so on (step S20). The CPU 101 stores the extracted clock system information 220, for example, in the storage 104.

Next, the CPU 101 operates as the loop structure generation unit 211, and generates the loop structure information 221 based on the net list 141, DFT specifications 142 and clock system information 220 (step S21). The CPU 101 stores the generated loop structure information 221, for example, in the storage 104. Next, the CPU 101 operates as the scan chain insertion unit 212, and generates scan chains SC based on the net list 141 and loop structure information 221 (step S22).

Next, the CPU 101 inserts the generated scan chains SC into the net list 141 (step S23), and thereby generates the scan chain inserted net list 201 and the scan chain structure information and protocol 202. The CPU 101 stores the scan chain inserted net list 201 and the scan chain structure information and protocol 202, for example, in the storage 104.

Next, the CPU 101 expands the ATPG/fault simulation execution program 145 read from the storage 104, in the RAM 103. That is, the CPU 101 starts the ATPG/fault simulation execution program 145.

The CPU 101 generates a test pattern 204, based on the scan chain inserted net list 201 and the scan chain structure information and protocol 202 (step S24).

Next, the CPU 101 executes a fault simulation based on the generated test pattern 204 (step S25), and generates a fault detection rate report 203.

After a fault simulation is completed, the CPU 101 outputs the scan chain inserted net list 201, scan chain structure information and protocol 202, fault detection rate report 203, and test pattern 204 to an external device (step S26).

2.4 Effects of Second Embodiment

With the structure of the present embodiment, a semiconductor integrated circuit that can execute the scan test of the first embodiment can be designed.

3. Modification Examples

A semiconductor integrated circuit according to above embodiments includes: a logic circuit (10) including: a first scan chain (SC2) configured to operate based on a first clock signal (CLK2); and a second scan chain (SC3) configured to operate based on a second clock signal (CLK3) different from the first clock signal; a clock generator (11) configured to generate the first and second clock signals; and a test control circuit (12) configured to control the first and second scan chains in a scan test. The first scan chain includes: a first flip-flop (FF2) having a first scan data input terminal (SI) and a first output terminal (DQ); and a first multiplexer (MX2a) having a first input terminal ("1") coupled to the first output terminal, a second input terminal ("0") to which a test pattern is input, and a second output terminal coupled to the first scan data input terminal. The first multiplexer is configured to electrically couple the first scan data input terminal to the first output terminal based on a first signal (LM) received from the test control circuit to form a first closed loop. The second scan chain includes a second flip-flop (FF3) having a second scan data input terminal (SI) and a third output terminal (DQ) that is not coupled to the second scan data input terminal.

With the above embodiment, a semiconductor integrated circuit that can suppress an increase of the power consumption during a test can be offered.

The embodiments are not limited to the above, but various modifications can be made.

Furthermore, the "coupling" in the above descriptions includes a state of being indirectly coupled, for example with a transistor, resistor or any other component interposed therebetween.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A semiconductor integrated circuit comprising:
 a logic circuit including:
  a first scan chain configured to operate based on a first clock signal; and
  a second scan chain configured to operate based on a second clock signal different from the first clock signal;
 a clock generator configured to generate the first and second clock signals; and
 a test control circuit configured to control the first and second scan chains in a scan test;
 wherein
 the first scan chain includes:
  a first flip-flop having a first scan data input terminal and a first output terminal; and
  a first multiplexer having a first input terminal coupled to the first output terminal, a second input terminal to which a test pattern is input, and a second output terminal coupled to the first scan data input terminal,
  the first multiplexer is configured to electrically couple the first scan data input terminal to the first output terminal based on a first signal received from the test control circuit to form a first closed loop, and
 the second scan chain includes a second flip-flop having a second scan data input terminal and a third output terminal that is not coupled to the second scan data input terminal.

2. The semiconductor integrated circuit according to claim 1, wherein
 the scan test includes a scan shift operation, a capture operation, and a loop operation executed prior to the scan shift operation,
 the test control circuit sets the first signal to a first logic level in the loop operation, and to a second logic level in the scan shift operation and in the capture operation, and
 the first multiplexer selects the first input terminal when the first signal is at the first logic level.

3. The semiconductor integrated circuit according to claim 2, wherein
 the clock generator generates the first clock signal and does not generate the second clock signal during the loop operation.

4. The semiconductor integrated circuit according to claim 3, wherein
the clock generator transmits one cycle of the first clock signal to the first scan chain during the loop operation.

5. The semiconductor integrated circuit according to claim 1, wherein
the logic circuit further includes a third scan chain configured to operate based on a third clock signal,
the clock generator generates the third clock signal,
the third scan chain includes:
  a third flip-flop having a third scan data input terminal and a fourth output terminal;
  a fourth flip-flop having a fourth scan data input terminal coupled to the fourth output terminal and a fifth output terminal; and
  a second multiplexer having a third input terminal coupled to the fifth output terminal, a fourth input terminal to which the test pattern is input, and a sixth output terminal coupled to the third scan data input terminal, and
the second multiplexer is configured to electrically couple the fifth output terminal of the fourth flip-flop to the third scan data input terminal of the third flip-flop based on the first signal received from the test control circuit to form a second closed loop.

6. The semiconductor integrated circuit according to claim 5, wherein
the scan test includes a scan shift operation, a capture operation, and a loop operation executed prior to the scan shift operation,
the test control circuit sets the first signal to a first logic level in the loop operation, and to a second logic level in the scan shift operation and in the capture operation, and
the first multiplexers selects the first input terminal and the second multiplexers selects the third input terminal when the first signal is at the first logic level.

7. The semiconductor integrated circuit according to claim 6, wherein
the clock generator generates the first and third clock signals and does not generate the second clock signal during the loop operation.

8. The semiconductor integrated circuit according to claim 7, wherein
the clock generator transmits one cycle of the first clock signal to the first scan chain, and two cycles of the third clock signal to the third scan chain during the loop operation.

9. The semiconductor integrated circuit according to claim 6, wherein
the clock generator generates the first to third clock signals that are synchronous with each other during the scan shift operation.

10. A circuit designing apparatus comprising:
a scan chain inserter configured to:
  generate a test circuit including:
    a first scan chain including:
      a first flip-flop having a first scan data input terminal and a first output terminal; and
      a first multiplexer having a first input terminal coupled to the first output terminal, a second input terminal to which a test pattern is input, and a second output terminal coupled to the first scan data input terminal; and
    a second scan chain including a second flip-flop having a second scan data input terminal and a third output terminal that is not coupled to the second scan data input terminal; and
  generate a second net list by inserting the first and second scan chains into a first net list of a semiconductor integrated circuit;
a loop structure generator configured to:
  generate information of a first closed loop formed by electrically coupling the first scan data input terminal to the first output terminal by the first multiplexer; and
  transmit the information to the scan chain insertion unit; and
an output circuit configured to externally output the second net list.

11. The circuit designing apparatus according to claim 10, wherein
the test circuit further includes:
  a third scan chain including:
    a third flip-flop having a third scan data input terminal and a fourth output terminal;
    a fourth flip-flop having a fourth scan data input terminal coupled to the fourth output terminal and a fifth output terminal; and
    a second multiplexer having a third input terminal coupled to the fifth output terminal, a fourth input terminal to which the test pattern is input, and a sixth output terminal coupled to the third scan data input terminal.

12. The circuit designing apparatus according to claim 10, further comprising:
a clock extractor configured to extract information of a first clock signal used for the first scan chain and a second clock signal different from the first clock signal used for the second scan chain.

13. The circuit designing apparatus according to claim 10, further comprising:
a fault simulator configured to:
  generate the test pattern;
  execute a fault simulation based on the second net list; and
  calculate a fault detection rate.

14. The circuit designing apparatus according to claim 13, wherein
the output circuit externally outputs the test pattern and a report of the fault detection rate.

15. The circuit designing apparatus according to claim 10, wherein
the scan chain inserter generates structure information of the first and second scan chains, and
the output circuit externally outputs the structure information.

16. A circuit designing method comprising:
generating a test circuit including:
  a first scan chain including:
    a first flip-flop having a first scan data input terminal and a first output terminal; and
    a first multiplexer having a first input terminal coupled to the first output terminal, a second input terminal to which a test pattern is input, and a second output terminal coupled to the first scan data input terminal; and
  a second scan chain including a second flip-flop having a second scan data input terminal and a third output terminal that is not coupled to the second scan data input terminal;

generating a second net list by inserting the first and second scan chains into a first net list of a semiconductor integrated circuit;

generating information of a first closed loop formed by electrically coupling the first scan data input terminal to the first output terminal by the first multiplexer; and externally outputting the second net list.

17. The circuit designing method according to claim 16, wherein the test circuit further includes:
  a third scan chain including:
    a third flip-flop having a third scan data input terminal and a fourth output terminal;
    a fourth flip-flop having a fourth scan data input terminal coupled to the fourth output terminal and a fifth output terminal; and
    a second multiplexer having a third input terminal coupled to the fifth output terminal, a fourth input terminal to which the test pattern is input, and a sixth output terminal coupled to the third scan data input terminal.

18. The circuit designing method according to claim 16, further comprising:

extracting information of a first clock signal used for the first scan chain and a second clock signal different from the first clock signal used for the second scan chain.

19. The circuit designing method according to claim 16, further comprising:

generating the test pattern;

executing a fault simulation based on the second net list;

calculating a fault detection rate; and externally outputting the test pattern and a report of the fault detection rate.

20. The circuit designing method according to claim 16, further comprising:

generating structure information of the first and second scan chains; and externally outputting the structure information.

* * * * *